June 24, 1952 J. I. MARCUM 2,601,539
TWO-FREQUENCY MICROWAVE OSCILLATOR
Filed Nov. 29, 1947
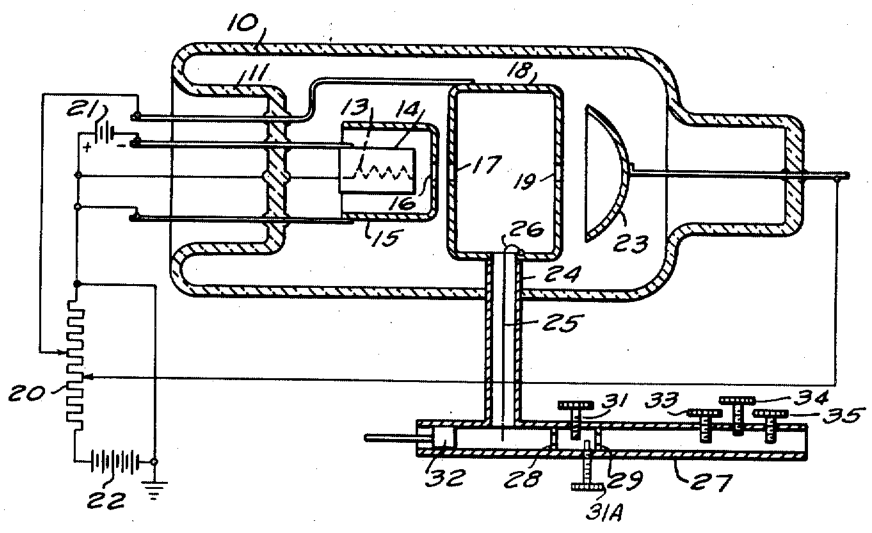
WITNESSES:
E.A. McCloskey
[signature]
INVENTOR
Jess I. Marcum.
BY
F. W. Lyle.
ATTORNEY Patented June 24, 1952

2,601,539

UNITED STATES PATENT OFFICE 2,601,539

TWO-FREQUENCY MICROWAVE OSCILLATOR

Jess I. Marcum, Santa Monica, Calif., assignor to Westinghouse Electric Corporation, East Pittsburgh, Pa., a corporation of Pennsylvania Application November 29, 1947, Serial No. 788,798

2 Claims. (Cl. 315—39)

My invention relates to electronic oscillation generators, and in particular, relates to oscillation generators of the cavity resonator microwave type.

For many purposes, it is desirable to be able to cause an oscillation generator to generate two different frequencies simultaneously, one of which is not a harmonic of the other. As a particular example, I may mention superheterodyne receivers for aircraft which are intended to receive signals both from a beacon and a radar system, the frequencies of said systems being separated from each other by a relatively small fraction of the absolute frequency of either one or the other.

At present, it is conventional to employ two separate local oscillators for generating the frequencies which are to be heterodyned respectively, with the beacon carrier and the radar carrier to produce the intermediate frequency for the receiver. In such systems, oscillation generators of the velocity-modulated type, such as the klystron, are frequently used for the local oscillators in the receiver.

One object of my invention is, accordingly, to provide an oscillation generator capable of generating two different frequencies, particularly in the micro-wave bands.

Another object of my invention is to provide an electron tube oscillation generator of the velocity-modulated type, which can be operated to generate, at will, either one of two frequencies, or both of said frequencies simultaneously.

Still another object of my invention is to provide a novel type of velocity-modulated electronic generator which is capable of simultaneously generating two different frequencies which do not bear harmonic relation to each other.

Still another object of my invention is to provide an oscillation generator capable of simultaneously generating two frequencies, the ratio of which may be changed at will.

Yet another object of my invention is to provide an oscillation generaor of the klystron type with circuit arrangements which enables it to generate simultaneously, two different frequencies, neither of which is the harmonic of the other, and the ratio of which can be varied at will over a substantial range.

Other objects of the invention will become apparent upon reading the following description taken in connection with the accompanying drawing, in which the single figure is a schematic illustration of one type of oscillation generator embodying the principles of my invention.

Referring in detail to the drawing, an electronic generator of the reflex klystron type, in many respects similar to Figure 1 of copending application, Serial No. 602,865, of William E. Good, entitled "Electrodes," filed July 2, 1945, comprises a sealed glass envelope 10 having a re-entrant stem 11 at one end thereof.

The envelope, which is preferably evacuated, encloses an "electron gun" for producing a relatively concentrated beam of electrons. As shown here, the "gun" includes a cathode comprising a heater 13 surrounded by an emitting member 14. Electrons emitted by this cathode are accelerated to a desired velocity by means of an accelerating electrode structure 15 having a small opening 16 in its end through which a concentrated beam of electrons is projected through a grid or other form of opening 17 in the walls of a conducting resonator or chamber 18. On the opposite wall of the chamber 18 in line with the path of the electron beam passing through the opening 17 is positioned a second grid or other form of opening 19 through which the electrons of the beam may emerge from the chamber 18. A suitable voltage source 21 having its positive terminal grounded supplies heating current to the heater 13. A second voltage source 22 having its negative terminal grounded and connected to electrode 15 supplies current to a potentiometer 20 to a variable tap on which is connected the resonating chamber 18.

As is well known in the art, it is possible, by adjusting the electrical potential at the opening 17 by means of the associated slider on potentiometer 20, to give the electrons entering through opening 17 into chamber 18 such a velocity that they will consume in passing from the opening 17 to the opening 19 one-half period of the natural frequency of electrical vibration of the resonant chamber 18. When this is done, those electrons which enter the opening 17 when the electrical field of chamber 18 has such a direction as to accelerate them, will leave the opening 19 one-half a cycle later when the electrical field at opening 19 tends, likewise, to accelerate them and will accordingly undergo a net increase of velocity in passing through chamber 18. On the other hand, those electrons entering through opening 17 at a time when the electric field within the chamber 18 is of such polarity as to retard them will likewise emerge from the opening 19 when the polarity of the electric field there is such as to retard them. The electron stream is accordingly subdivided into alternate groups of higher velocity electrons and lower velocity electrons; and as these groups travel forward the electrons will tend to become segregated into "bunches"; in other words, the electron stream will have successive portions in which the electron density is high separated by portions in which the electron density is low.

It is likewise known in the art that by positioning an electrode of proper potential at a suitable distance outside the opening 19 of the resonant chamber, the velocities of the electrons in the stream may be reversed; and the "bunches," or at least a substantial portion thereof, may be caused to re-enter the resonant chamber 18. By proportioning the distance of the reflector electrode so that electric field in the chamber 18 opposes this reversed velocity at the time the bunches or concentrated portions of the electron stream thus pass in the reverse direction through the chamber 18, the electrical vibrations in the latter are reinforced. By suitable arrangements too well known in the art to require description here, electrical energy may be withdrawn for use in external circuits at the frequency of the vibrations thus maintained in the chamber 18.

Aligned with the opening 19 is such a reflector electrode 23 supported from the glass envelope by a suitable end leading wire which is connected to a variable tap on the resistor 20. The reflector electrode 23 is given such a potential that it repels the electron emerging through the opening 19 and causes them to repass through the opening 19 into the resonant chamber 18, thereby reinforcing the electrical oscillations taking place in the later in accordance with the foregoing description.

Issuing from one portion of the wall of the chamber 18 and passing with a vacuum-tight seal through the wall of the envelope 10, I provide a concentric line-coupling, comprising a tubular member 24 and a concentric core 25, the latter forming a coupling loop 26 in a manner well known in the micro-wave art, with the resonant chamber 18. The concentric line leads to an external resonant cavity, embodied in a wave-guide 27 having a tunable cavity resonator comprising apertured diaphragms 28—29 embracing the projecting end of a thumb screw 31 threaded through the wall of the wave-guide 27. The core 25 projects into the interior of the wave-guide 27 at a point just outside the diaphragm 28, and the wave-guide 27 is provided at the end adjacent its junction with the member 24 with a displaceable tuning piston 32 of a type well known in the micro-wave art. The coupling between the cavity resonators 18 and 28—29 should be a rather tight one.

The wave-guide 27 projects at the end adjacent the diaphragm 29 for a substantial distance, and the walls of said projecting portion are provided with a matcher, comprising three thumb screws 33, 34, and 35 of a type well known in the art. The wave-guide may then terminate in an open end emitting electromagnetic radiation into free space, or may supply power to any device desired.

I have found that when a spectrum analyzer or other suitable frequency measuring device is set up outside the open end of the wave-guide 27, and the frequency of the cavity resonator between diaphragms 28 and 29 is varied by adjusting the thumb screw 31, a point is reached in which waves of two different frequencies are emitted from the wave-guide 27 simultaneously. When the resonant frequency of the cavity between diaphragms 28 and 29 is below the value at which such two frequencies appear, the klystron 10 is found to oscillate at one of these frequencies; and when the frequency of the cavity controlled by thumb screw 31 is tuned slightly above the point in question, the klystron 10 will oscillate at the other of these frequencies, but over a certain range of adjustment of screw 31, the tube actually oscillates at both frequencies. I have proved that these oscillations are actually simultaneous and not merely alternate and consecutive by energizing a crystal frequency mixer from the output of the wave-guide and amplifying the output thereof. A distinct beat note corresponding to the difference between the two frequencies is produced, and this would obviously be impossible if the two frequencies were not being generated simultaneously.

The difference between the two frequencies I have found to be a function of the Q of the resonant cavity between the diaphragms 28 and 29.

In one experiment of the arrangement above described, I employed a so-called Shephard klystron oscillator operating at a frequency around 10,000 megacycles per second, and coupled to a wave guide in the conventional manner. With this arrangement, the two frequencies produced in the output of the wave guide were respectively 9810 and 9885 megacycles.

In view of the fact that the frequency difference existing in the wave-guide depends upon the Q of the cavity 28—29, it is possible to vary this frequency difference by providing the cavity 28—29 with a projecting slug 31A of some material such as steel, in which the electromagnetic field existing in the cavity produces substantial energy losses, and arranging the system so that the distance of projection of the slug into the cavity 28—29 can be varied at will.

While I have described a specific embodiment of my invention in which it is applied to reflex klystron oscillators, it will be recognized that it is applicable to other similar types of oscillators such as two cavity klystrons, frequency multiplying klystrons, monotrons, and the like. It is, accordingly, within the purview of my invention to apply a coupling between a variable ancillary cavity resonator and the resonating cavity of any type of oscillation generator employing the vibration of such cavities to aid its oscillation.

I claim as my invention:

1. In combination with a klystron oscillation generator, a wave-guide having a tight coupling to a cavity resonator of said klystron generator, an ancillary cavity resonator connected to said wave-guide and provided with means for adjusting its tuning, said ancillary cavity resonator being provided with means for variably inserting into its interior an energy absorbing device.

2. In combination, an oscillation generator of the cavity resonator type, a conductor for high frequency oscillations tightly coupled to said generator, an ancillary cavity resonator connected to said conductor and provided with means for adjusting its tuning, and means for absorbing energy inserted into the interior of said ancillary cavity resonator.

JESS I. MARCUM.

REFERENCES CITED

The following references are of record in the file of this patent:

UNITED STATES PATENTS

| Number | Name | Date |
|---|---|---|
| 2,233,166 | Hahn | Feb. 25, 1941 |
| 2,280,824 | Hansen et al. | Apr. 28, 1942 |
| 2,406,372 | Hansen et al. | Aug. 27, 1946 |
| 2,410,840 | Samuel | Nov. 12, 1946 |
| 2,432,571 | Haeff | Dec. 16, 1947 |
| 2,444,194 | Goldstine | June 29, 1948 |
| 2,445,077 | Nergaard et al. | July 13, 1948 |
| 2,456,422 | James | Dec. 14, 1948 |